(12) United States Patent
Wiegand

(10) Patent No.: US 11,685,414 B2
(45) Date of Patent: Jun. 27, 2023

(54) DEVICE FOR TRANSPORTING AT LEAST ONE PASSENGER

(71) Applicant: Josef Wiegand GmbH & Co. KG, Rasdorf (DE)

(72) Inventor: Hendrik Wiegand, Rasdorf (DE)

(73) Assignee: JOSEF WIEGAND GMBH & CO. KG, Rasdorf (DE)

(*) Notice: Subject to any disclaimer, the term of this patent is extended or adjusted under 35 U.S.C. 154(b) by 456 days.

(21) Appl. No.: 16/896,835

(22) Filed: Jun. 9, 2020

(65) Prior Publication Data

US 2020/0391768 A1 Dec. 17, 2020

(30) Foreign Application Priority Data

Jun. 14, 2019 (DE) .................... 20 2019 103 340.1

(51) Int. Cl.
*B61C 3/00* (2006.01)
*B60L 15/00* (2006.01)

(52) U.S. Cl.
CPC .............. *B61C 3/00* (2013.01); *B60L 15/005* (2013.01)

(58) Field of Classification Search
CPC .......... B61C 3/00; B60L 15/005; A63G 25/00
See application file for complete search history.

(56) References Cited

U.S. PATENT DOCUMENTS

| 3,803,466 A | 4/1974 | Starkey |
| 6,237,499 B1 | 5/2001 | McKoy |
| 6,910,972 B2 * | 6/2005 | Norbury .................. A63G 7/00 104/77 |
| 2004/0266540 A1 | 12/2004 | Norbury |
| 2009/0031913 A1 | 2/2009 | Heaslip et al. |
| 2011/0061558 A1 | 3/2011 | Crawford et al. |

FOREIGN PATENT DOCUMENTS

| DE | 202010000403 U1 | 8/2011 |
| DE | 202012100896 U1 | 3/2013 |
| DE | 102012104687 B3 | 9/2013 |
| EP | 1202780 A1 | 5/2002 |
| EP | 1845005 A2 | 10/2007 |
| EP | 2295123 A1 | 3/2011 |
| WO | 2006/080845 A1 | 8/2006 |
| WO | 2006079326 A2 | 8/2006 |

* cited by examiner

Primary Examiner — Robert J McCarry, Jr.
(74) Attorney, Agent, or Firm — Dinsmore & Shohl LLP

(57) ABSTRACT

A unit for transporting at least one passenger has at least one first rail line with at least one vehicle that is travelable and guided on the at least one rail line, and located on the at least one rail line. The vehicle and the at least one first rail line are actively connected by a drive device, with the drive device being configured as an electric linear motor. The at least one vehicle has a control for influencing the speed of the at least one vehicle on the at least one first rail line. The first control a manually operable as a passenger control by at least one passenger in the vehicle.

13 Claims, 2 Drawing Sheets

DEVICE FOR TRANSPORTING AT LEAST ONE PASSENGER

CROSS-REFERENCE TO RELATED APPLICATION

This application claims priority of German Utility Model DE 20 2019 103 340.1 filed Jun. 14, 2019, the entire content of which is incorporated herein by reference.

FIELD OF THE INVENTION

The invention relates to a unit for transporting at least one passenger, wherein the unit has at least one first rail line, with at least one vehicle that is travelable on the first rail line being located on the at least one first rail line.

BACKGROUND OF THE INVENTION

Units for transporting passengers or persons, such as described above, are also known as fairground rides on which people ride for fun at high speeds in some cases.

An artificial toboggan run that comprises a rail line on which one or more sleds are travelable for transporting persons is in particular known in this connection. The sleds are not drivable, that is the rail line has to be laid with a slope to make the ride experience possible. The rail line here in particular comprises two rails that are arranged spaced apart from one another and on which the sleds are supported in a travelable manner, with the support of the sled on the rail line having the two rails extending in parallel with one another being designed such that the sled in particular does not lift off the rail line. This means that respective roller pairs are arranged on the upper and lower sides of the rail, with corresponding rollers also additionally being provided on the side of the rail. It follows on directly from this that the sled is guided both in the longitudinal direction and in the transverse direction, with a lifting from the rail line additionally being precluded by the rollers engaging at the rails from below.

There is furthermore a fairground ride for transporting persons in which the ride path is formed as an elongate tub. The sled is located in the tub, with the sled being able to reach a travel speed of up to 40 kph. The speed can be determined by the passenger up to this maximum of 40 kph. The drive of the sled takes place via an electric motor, with a so-called automatic distance control additionally being provided to prevent rear end collisions. A predefined base speed prevents a stopping of the sled on the path. Since the side has its own drive, there is no need to provide artificial slope stretches in the ride path.

An innovative unit for transporting at least one passenger, wherein the unit has at least one first rail line, with at least one vehicle that is travelable and guided on the at least one first rail line being located on the at least one first rail line, is characterized in accordance with the invention in that the vehicle and the at least one rail line are actively connected by a drive device, with the drive device being configured as an electric, in particular contactless, linear motor, with the at least one vehicle having a control for influencing the speed of the at least one vehicle on the at least one rail line, and with the control being manually operable as a passenger control by the at least one passenger in the vehicle. In particular a linear induction motor (LIM) can be used as the electric contactless motor here.

It is known from US 2011/0061558 that the stator is controlled as an active element in the rail line, that is it receives the corresponding control impulses, whereas the rotor as a passive element is not controlled in the vehicle.

SUMMARY OF THE INVENTION

The invention now comprises three partial regions that between them enable a ride experience that is not comparable with the known fairground rides as described above. This is in particular due to the fact that the unit for transporting persons in particular comprises a plurality of vehicles that are driven by an advantageously contactless electric motor, wherein the speed of each vehicle is determined within certain preset limits by the passenger on the rail line himself.

Advantageous features and embodiments of the invention are disclosed herein.

Provision is thus made in accordance with a further feature that the first rail line has two ride rails for receiving and guiding the at least one vehicle. It is, however, theoretically also conceivable only to provide one ride rail for receiving the vehicle, which can possibly significantly reduce the space requirements of such units.

Provision is made in the preferred configuration of the electric linear motor as a linear induction motor (LIM) that the stator extending in parallel with the rail line comprises an aluminum plate that is supported on a steel plate. The stator is held by a frame that also supports the first rail line. This means that the stator, as a passive reaction component, is located in the region of the first rail line. The rotor, as an active electromagnetic drive element as a part of the vehicle, has a plurality of coils. The linear induction motor is to this extent configured as an asynchronous AC linear motor.

Provision is made in accordance with a further feature of the invention that the electric linear motor (LIM) has a second, independent control that is the master of the first control, that is the control by the passenger, and that communicates corresponding signals to the linear motor on the basis of the spacing of two or more vehicles from one another, the speed of the vehicles, and/or the route, to accelerate, decelerate, or stop the travel speed of individual vehicles. This is necessary for safety reasons since, in particular with a plurality of vehicles on the rail line, a sufficient spacing from the respective neighboring vehicle can again be established in dependence on the spacing of the vehicles from one another by the control of the linear motor at least with respect to one of the vehicles. For certain minimum spacings may not be fallen below for safety reasons.

It has already been pointed out that the rotor arranged in the vehicle forms the active electromagnetic drive element in the LIM. As such, this drive element is controllable. This means that the first control, that is the control actuable by the passenger, is connected to the rotor as an active drive element. The same applies to the second control that is independent and that is the master of the first control that is actuable by the passenger. A control of the rotor located in the vehicle by the two controls, that are likewise arranged in the vehicle, is substantially simpler to design than a control of the stator. In another respect, this kind of control is substantially less susceptible to failure because the individual control components in the vehicle are largely protected from the influences of weather.

It applies to the design embodiment that the guidance of the vehicle on the first ride rails takes place by a respective one or more first roller sets. A first roller set advantageously comprises at least three rollers, with one roller engaging laterally at the respective ride rail and two rollers engaging at the respective ride rail from above and from below.

The rollers engaging at the first ride rail from above and from below can alternatively each be formed as active roller pairs. A smoother running hereby results.

Each vehicle advantageously has at least four first roller sets that are connected to the first ride rails opposite and behind one another, that is in a square. A stable guidance of the vehicle on the rail line hereby results.

A particularly advantageous embodiment is characterized in that a second rail line is present in addition to the first rail line. The second rail line also comprises, in particular also like the first rail line, two second ride rails, with a respective second ride rail running on each side of the first rail line. The guidance of the vehicle on the second ride rail preferably takes place by one or more second roller sets, with a second roller set in particular comprising two rollers, with one roller engaging at the respective second ride rail inwardly laterally, and with a second roller contacting the respective second ride rail from above. This means that the vehicle is not only held and guided on the first rail line by the drive device having the corresponding roller sets, but furthermore the passenger cabin of the vehicle is also additionally held and guided by the second roller sets, with it also applying with respect to the second roller sets that four such roller sets here advantageously connect the passenger cabin to the second rail line.

It is in particular essential in the design having two rail lines in which the passenger cabin is guided by and travelably connected to the second rail line that the passenger cabin is supported in an overhung manner by a connection device at the drive device in the direction transverse to the longitudinal direction of the ride rails and in the direction of the vertical axis. The support is designed with no play in the longitudinal direction of the ride rails. The forces on accelerating and deceleration can thus be transmitted without play in the longitudinal direction. The advantage of this design is that there are no tensions, whereby the linear motor can be guided more precisely, which is relevant to the function of the linear motor.

In addition, the forces that occur such as centrifugal forces and weight forces are hereby also split over two rail lines, which in particular also permits higher cornering speeds.

This means that an embodiment of the unit in accordance with the invention is generally conceivable if only a first rail line is present and if the vehicle is connected to this first rail line by the drive device by the corresponding roller sets; however, it has also been found that increased safety, in particular at high speeds, and here in particular at high cornering speeds, is present when a second rail line is provided having a respective second ride rail at each side of the first rail line, with here the connection between the vehicle, and in particular the passenger cabin, and the second rail line also taking place by roller sets, as has already been described above. The roller sets provide the guidance of the vehicle and the travelability.

It has been found to be very particularly advantageous if the first and second rail lines are held by a common frame since a stable unit comprising the first and second rail lines is hereby formed that so stiff in itself that no twists and misalignments can occur.

BRIEF DESCRIPTION OF THE DRAWINGS

The invention will be described in more detail below by way of example with reference to the drawings.

DETAILED DESCRIPTION OF THE INVENTION

Figure 1:
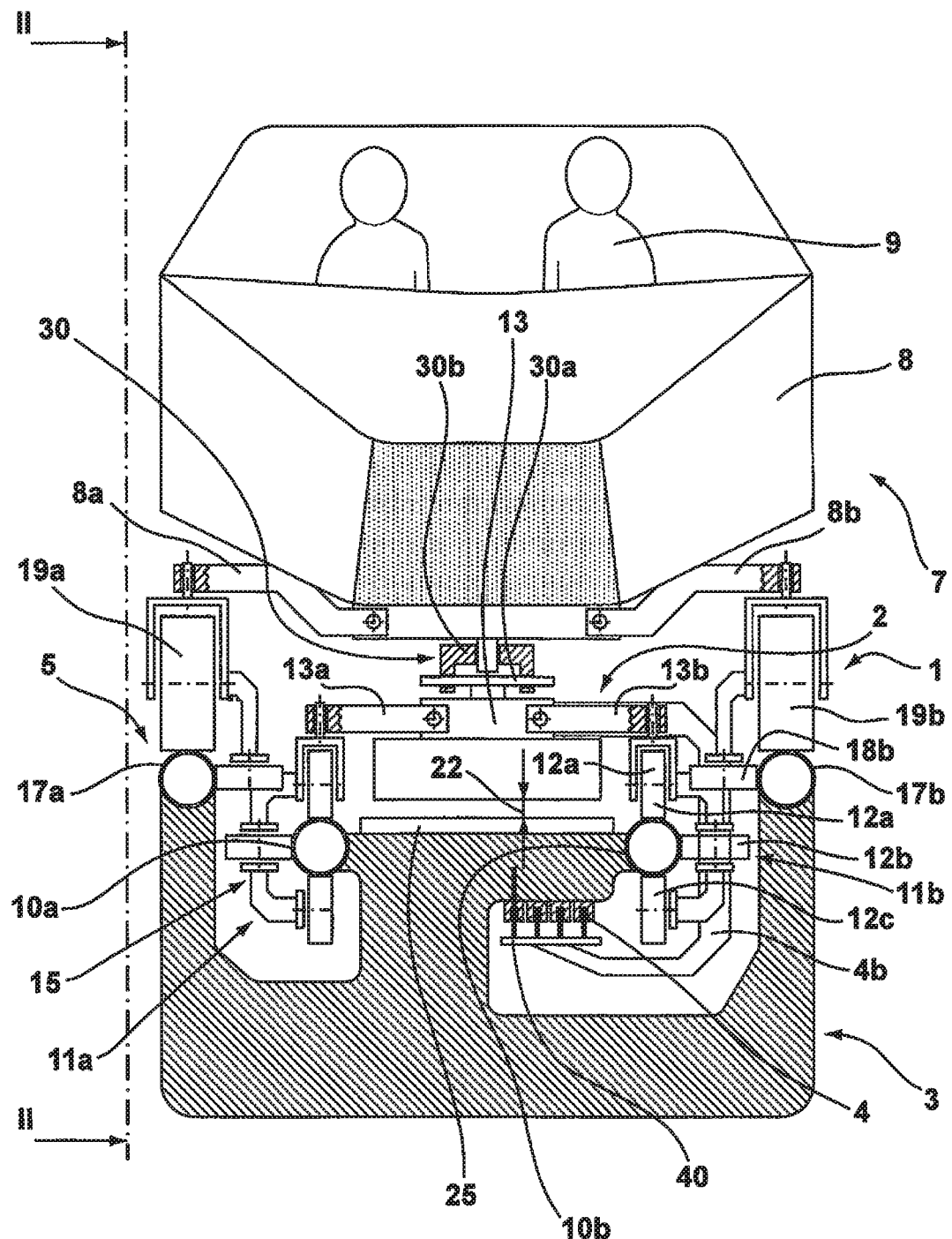
FIG. 1 is a sectional view through the unit in accordance with the invention for transporting at least one passenger.
Figure 2:
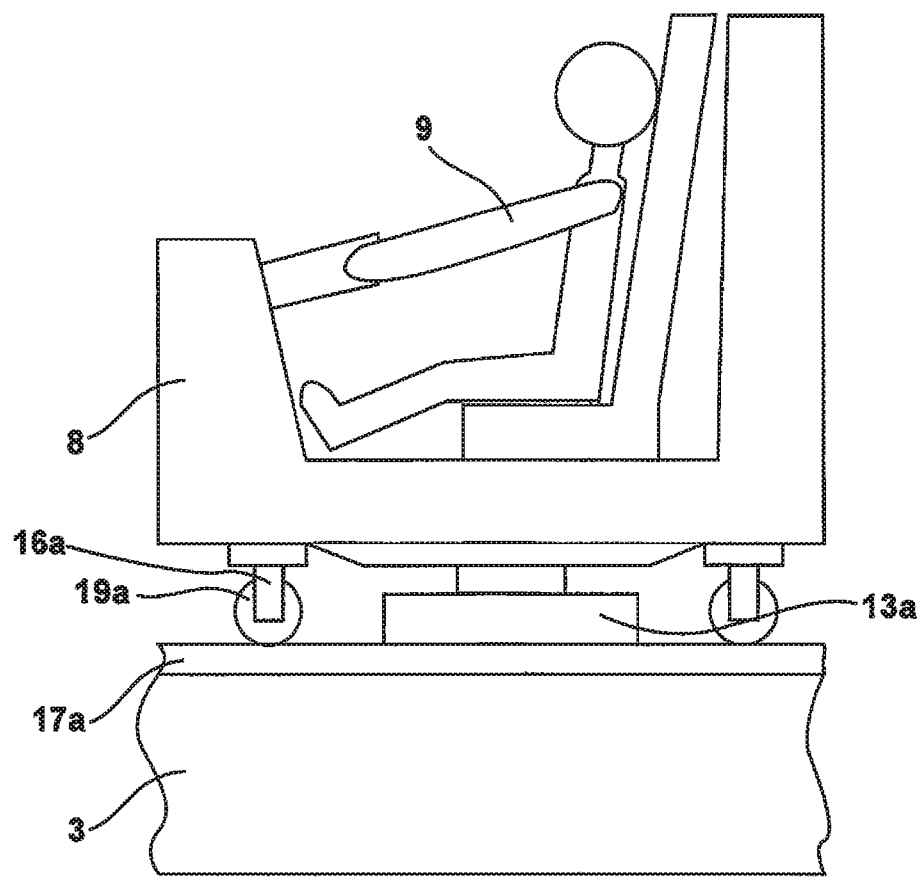
FIG. 2 is a sectional view in accordance with the line II-II of FIG. 1.

The unit 1 for transporting at least one passenger comprises a frame 3 having a first rail line 5 and a second rail line 15. The vehicle, marked by 7, having the passenger cabin 8 for receiving the passengers 9 is supported on the first and second rail lines 5, 15. The vehicle further comprises a drive device 2 having a rotor 14 at the vehicle and having the stator 25 at the rail line.

The stator 25 has a plate-like arrangement held by the first rail line 5 and having an upper plate or layer of aluminum that is supported on a steel plate. The rotor 14 comprises a plurality of coils arranged after one another. Such a motor is also called a linear induction motor (LIM).

The first rail line 5 has two first ride rails 10a, 10b that are held by the frame 3. A first roller set 11a, 11b engages at the first and second ride rails 10a, 10b, with such a first roller set having three rollers 12a, 12b, and 12c, with the rollers 12a and 12c engaging at the first ride rail from above and below respectively, whereas the roller 12b contacts the first ride rail of the first rail line 5 horizontally, that is laterally outwardly. Four respective roller sets 11a, 11b are in particular here provided per vehicle 7, and indeed in each case arranged pairwise opposite and behind one another at the vehicle. A safe guidance of the vehicle 7 is hereby ensured overall.

The roller sets are connected to an axle mount 13 by axles 13a, 13b. The axle mount 13 is supported on the housing of the rotor 14 of the linear motor. It thus follows on from this that the rotor of the linear motor is part of the chassis of the vehicle marked by 7.

In the region of the first rail line 5, the frame 3 has conductor rails 4 that are in contact with a collector 4a that is held by an arm 4b. The arm 4b is in turn connected to the axle mount 13 that is, as already stated, supported on the rotor 14.

If the passenger cabin 8 of the vehicle 7 is now looked at, left and right axles 8a, 8b are recognized that each receive a second roller set 16a, 16b that are supported at the second ride rails 17a, 17b of the second rail line 15. In this respect, a respective first roller 18a, 18b is provided that engages horizontally laterally inwardly at the second ride rail 17a, 17b and a respective second roller 19a, 19b is provided that lies on the second ride rail 17a, 17b from above. Both rollers, both the first rollers 18a, 18b, and the second rollers 19a, 19b, are respective parts of the second roller set 16a, 16b, with the roller set 16a, 16b being held by the axles 8a, 8b.

It has already been shown above that the drive device 2 has the rotor 14 that is in active connection over the spacing 22 with the stator 25 that is configured as a reaction plate of the contactless linear motor. The reaction plate, as already stated, comprises an aluminum plate or aluminum layer that is supported on a steel plate as a carrier. The reaction plate or the stator is held by the frame 3.

It has already been pointed out that the rotor 14, having a plurality of coils arranged behind one another, has an axle mount 13, with the axle mount 13 being arranged at the passenger cabin 8 of the vehicle 7 by a connection device 30. The connection device 30 comprises a receiving member 30a and an engagement member 30b, with the engagement member 30b being arranged at the passenger cabin, whereas the receiving member 30a is held by the axle mount 13.

It is advantageous here that the engagement member 30b in the receiving member 30a is supported in an overhung manner, that is with play, in the direction of the vertical axis 30c and transversely to the rail line 5 to avoid tensions of the vehicle 7 on the two rail lines 5, 15. The support has no play in the longitudinal direction toward the rail line.

Two or more such connection devices can be provided over the length of the vehicle. The connection devices can here be configured as plug-in and/or latching connections.

REFERENCE NUMERAL LIST 1 unit
2 drive device
3 frame
4 power line
4a collector
4b arm
5 first rail line
7 vehicle
8 passenger cabin
8a left axle
9 passenger
10a first ride rail
10b first ride rail
11a first roller set
11b first roller set
12a roller
12b roller
12c roller
13 axle mount
13a axle
13b axle
14 rotor
15 second rail line
16a second roller set
16b second roller set
17a second ride rail
17b second ride rail
18a first roller
18b first roller
19a second roller
19b second roller
22 spacing
25 stator
30 connection device
30a receiving member
30b engagement member
30c vertical axis

The invention claimed is:

1. A unit for transporting at least one passenger, comprising:
at least one first rail line;
at least one vehicle that is travelable on the at least one rail line and is located on the at least one first rail line;
a drive device actively connecting the vehicle and the at least one rail line, the drive device comprising an electric linear motor, the electric linear motor having a stator arranged in a region of the at least one first rail line, and a rotor received by the at least one vehicle and configured as an active electromagnetic element;
a control associated with the at least one vehicle for influencing a speed of the at least one vehicle on the at least one first rail line, the control being manually operable as a passenger control by a passenger in the at least one vehicle,
wherein the speed of the vehicle is determined by the passenger.

2. The unit according to claim 1, wherein the at least one first rail line comprises two first ride rails for receiving and guiding the at least one vehicle.

3. The unit according to claim 2, further comprising one or more first roller sets, the guidance and the traveling of the at least one vehicle on the first ride rails taking place by the one or more first roller sets.

4. The unit according to claim 1, wherein:
the at least one vehicle comprises two or more vehicles; and
the unit further comprising an independent second control that is a master of the first control and that transmits corresponding signals to the linear motor on a basis of a spacing of the two or more vehicles from one another, a speed of individual of the two or more vehicles, and/or a route to accelerate or decelerate or stop a travel speed of individual of the two or more vehicles.

5. The unit according to claim 4, wherein the first and/or the second control is/are electrically connected to the rotor.

6. The unit according to claim 1, wherein the linear motor comprises a stator and a rotor, the linear motor being contactless, with a spacing being provided between the stator and the rotor.

7. The unit according to claim 1, further comprising a second rail line.

8. The unit according to claim 7, wherein the second rail line comprises two second ride rails, with a respective second ride rail running at each side of the first rail line.

9. The unit according to claim 7, further comprising one or more second roller sets, the guidance and the traveling of the at least one vehicle on the second ride rails taking place by the one or more second roller sets.

10. The unit according to claim 7, further comprising a continuous frame holding the first and second rail lines.

11. The unit according to claim 1, further comprising a connection device, the at least one vehicle having a passenger cabin that is connected to the drive device by the connection device.

12. The unit according to claim 11, wherein the connection device is formed as an overhanging support in a direction of a vertical axis and transversely to an extent of the rail line.

13. The unit according to claim 11, wherein the connection device has no play in a longitudinal direction of the rail line for a jerk-free transmission of forces on accelerating and decelerating.

* * * * *